United States Patent
Kimura

(10) Patent No.: US 7,754,829 B2
(45) Date of Patent: Jul. 13, 2010

(54) ROOM TEMPERATURE-CURABLE ORGANOPOLYSILOXANE COMPOSITIONS

(75) Inventor: Tsuneo Kimura, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 858 days.

(21) Appl. No.: 11/279,961

(22) Filed: Apr. 17, 2006

(65) Prior Publication Data

US 2006/0258817 A1    Nov. 16, 2006

(30) Foreign Application Priority Data

May 13, 2005    (JP)    ............................. 2005-141295

(51) Int. Cl.
C08L 83/04    (2006.01)
B32B 27/00    (2006.01)

(52) U.S. Cl. ........................ 525/477; 524/588; 524/863

(58) Field of Classification Search .................. 525/477
See application file for complete search history.

(56) References Cited

U.S. PATENT DOCUMENTS

| | | | | |
|---|---|---|---|---|
| 3,175,993 A * | 3/1965 | Weyenberg | ................... | 528/27 |
| 4,339,563 A * | 7/1982 | Takago et al. | ................... | 528/14 |
| 4,514,529 A * | 4/1985 | Beers et al. | .................. | 523/200 |
| 4,871,827 A * | 10/1989 | Klosowski et al. | ............. | 528/17 |
| 5,082,596 A * | 1/1992 | Fukuda et al. | ............... | 252/511 |
| 5,319,050 A * | 6/1994 | Kimura et al. | ................. | 528/12 |
| 5,352,491 A * | 10/1994 | Cifuentes et al. | ............. | 427/387 |
| 5,389,170 A * | 2/1995 | Brady et al. | ................. | 156/109 |
| 5,473,026 A * | 12/1995 | Strong et al. | ................. | 525/477 |
| 5,502,096 A | 3/1996 | Kimura et al. | | |
| 5,705,586 A * | 1/1998 | Sato et al. | ...................... | 528/15 |
| 5,705,591 A * | 1/1998 | Matsuda et al. | ............... | 528/42 |
| 6,008,284 A * | 12/1999 | Nylund et al. | .............. | 524/425 |
| 6,660,281 B1 | 12/2003 | Nakanishi et al. | ........... | 424/401 |
| 6,734,250 B2 * | 5/2004 | Azechi et al. | ............... | 524/588 |
| 6,812,280 B2 * | 11/2004 | Horikoshi et al. | ........... | 524/588 |
| 6,844,393 B2 * | 1/2005 | Goto et al. | .................. | 524/588 |
| 6,939,925 B2 * | 9/2005 | Sakamoto et al. | ........... | 525/477 |
| 7,094,822 B2 * | 8/2006 | Sagal et al. | ................. | 524/404 |
| 2002/0010251 A1 * | 1/2002 | Muramatsu et al. | ......... | 524/493 |
| 2003/0087448 A1 * | 5/2003 | Abe et al. | ..................... | 436/73 |
| 2003/0105206 A1 * | 6/2003 | Hara et al. | .................. | 524/439 |
| 2003/0153672 A1 * | 8/2003 | Sakamoto et al. | ........... | 524/588 |
| 2003/0195322 A1 * | 10/2003 | Horikoshi et al. | ............. | 528/10 |
| 2003/0211339 A1 * | 11/2003 | Araki et al. | ................. | 428/447 |
| 2003/0212197 A1 * | 11/2003 | Sakamoto et al. | ........... | 524/588 |
| 2003/0216536 A1 * | 11/2003 | Levandoski et al. | ........... | 528/10 |
| 2004/0002571 A1 * | 1/2004 | Sakamoto et al. | ........... | 524/588 |
| 2004/0242762 A1 * | 12/2004 | Horikoshi et al. | ........... | 524/588 |
| 2005/0059772 A1 * | 3/2005 | Horikoshi et al. | ........... | 524/588 |
| 2006/0135687 A1 * | 6/2006 | Fukui | ......................... | 524/588 |

FOREIGN PATENT DOCUMENTS

| | | |
|---|---|---|
| JP | 5-302035 | 11/1993 |
| JP | 7-118531 | 5/1995 |
| JP | 7-119395 | 12/1995 |
| JP | 2003-73553 | 3/2003 |
| JP | 2003-327829 | 11/2003 |
| JP | 2005-97332 | 4/2005 |

OTHER PUBLICATIONS

Technical Data sheet for 3-mercaptopropyltrimethoxysilane, 2 pages, 2009.*

* cited by examiner

*Primary Examiner*—Randy Gulakowski
*Assistant Examiner*—Robert Loewe
(74) *Attorney, Agent, or Firm*—Oblon, Spivak, McClelland, Maier & Neustadt, L.L.P.

(57) ABSTRACT

RTV organopolysiloxane compositions are provided comprising (A) an organosiloxane polymer comprising $R_3SiO_{1/2}$ units and $SiO_{4/2}$ units in a molar ratio of 0.6-1.2 wherein R is a monovalent $C_1$-$C_6$ hydrocarbon, and having a hydroxysilyl content of less than 0.04 mole/100 g, (B) a polysiloxane having a hydrolyzable silyl group incorporated in the molecular chain via an alkylene linkage, and (C) a cure catalyst. The compositions have a low viscosity and good workability when heated, develop initial adhesion when allowed to cool after application, and thereafter cure at room temperature and induce crosslinking reaction, affording improved rubber physical properties.

10 Claims, No Drawings

ROOM TEMPERATURE-CURABLE ORGANOPOLYSILOXANE COMPOSITIONS

CROSS-REFERENCE TO RELATED APPLICATION

This non-provisional application claims priority under 35 U.S.C. §119(a) on Patent Application No. 2005-141295 filed in Japan on May 13, 2005, the entire contents of which are hereby incorporated by reference.

TECHNICAL FIELD

This invention relates to room temperature-curable organopolysiloxane compositions which have a low viscosity and good workability when heated, develop initial adhesion when allowed to cool after application, and thereafter cure at room temperature and induce crosslinking reaction, affording improved rubber physical properties, so that they are suited for use as silicone-based sealing agents, adhesives, coating agents, potting agents or the like. It is noted that the term "room temperature-curable" is often referred to as RTV as it is synonymous with room temperature-vulcanizable.

BACKGROUND ART

One-part silicone compositions of the condensation cure type are used as sealing agents, adhesives, coating agents or potting agents in a wide variety of areas including buildings, electric and electronic equipment and components, transporting vehicles, electric appliances and the like. Since air-borne moisture is necessary for crosslinking reaction to take place, rubber gradually forms from the surface. This suggests that it takes several days until the composition cures to depth. It is thus very difficult to acquire an adhesion strength immediately after application. Green strength can be increased by heavily loading a silicone composition with fumed silica to provide an extremely increased viscosity. This improvement is made at the sacrifice of working efficiency.

Also used as sealing agents, adhesives, coating agents or potting agents are two-part silicone compositions of the condensation cure type in which a crosslinking agent is provided as a separate package. As compared with the one-part compositions, the two-part compositions are improved in deep cure. JP-A 7-118531 discloses that the combined use of an amine compound and a ketone compound enhances the deep cure. This composition still requires several days until satisfactory bond strength is developed.

One known measure of providing initial adhesion is JP-B 7-119395 that discloses a composition comprising a siloxane polymer composed of $R_3SiO_{1/2}$ units and $SiO_{4/2}$ units, an organopolysiloxane having hydrolyzable silyl groups bonded at opposite ends via siloxane linkages, and a condensation catalyst. It is still desired to improve the bond strength development of this composition.

DISCLOSURE OF THE INVENTION

An object of the present invention is to provide room temperature-curable organopolysiloxane compositions which have a low viscosity and good workability when heated, develop initial adhesion when allowed to cool after application, and thereafter cure at room temperature and induce crosslinking reaction, affording improved rubber physical properties, so that they are suited for use as silicone-based sealing agents, adhesives, coating agents, potting agents or the like.

Making investigations with a focus on the viscosity versus temperature of a mixture of a siloxane polymer comprising $R_3SiO_{1/2}$ units and $SiO_{4/2}$ units and a silicone oil, the inventor has found that a combination of a siloxane polymer comprising $R_3SiO_{1/2}$ units and $SiO_{4/2}$ units, having a minimal content of hydroxysilyl groups in the molecule, with a polysiloxane having a hydrolyzable silyl group incorporated in the molecular chain via an alkylene linkage yields a composition that shows both workability when heated and adhesion when cooled, and further addition of a cure catalyst to the composition ensures crosslinking of the polysiloxane having a hydrolyzable silyl group incorporated in the molecular chain via an alkylene linkage, resulting in improved rubber physical properties.

The present invention provides a room temperature-curable organopolysiloxane composition comprising (A) 100 parts by weight of an organosiloxane polymer comprising $R_3SiO_{1/2}$ units and $SiO_{4/2}$ units wherein R is each independently a substituted or unsubstituted monovalent hydrocarbon group of 1 to 6 carbon atoms, a molar ratio of $R_3SiO_{1/2}$ units to $SiO_{4/2}$ units being from 0.6 to 1.2, and the polymer containing less than 0.04 mole of hydroxysilyl groups per 100 grams of the polymer, (B) 50 to 200 parts by weight of a polysiloxane having a hydrolyzable silyl group incorporated in the molecular chain via an alkylene linkage, and (C) 0.01 to 10 parts by weight of a cure catalyst.

In a preferred embodiment, component (B) comprises a polysiloxane having the general formula (1), (2) or (3).

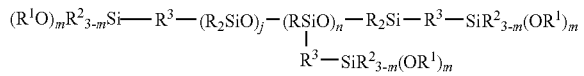

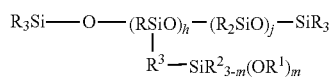

Herein R is as defined above, $R^1$ is each independently an alkyl group of 1 to 6 carbon atoms or alkoxyalkyl group of 2 to 10 carbon atoms, $R^2$ is each independently a substituted or unsubstituted monovalent hydrocarbon group, $R^3$ is an alkylene group of 1 to 12 carbon atoms, m is an integer of 1 to 3, n is an integer of at least 1, j is an integer of at least 10, and h is an integer of at least 2.

In another preferred embodiment, the organopolysiloxane composition may further comprise at least one member of:

(D) 0.1 to 10 parts by weight of a hydrolyzable silane and/or siloxane having a boiling point of at least 150° C./760 Torr, (E) 1 to 500 parts by weight of a filler which is typically selected from fumed silica, precipitated silica and calcium carbonate, (F) 0.1 to 20 parts by weight of a silane coupling agent.

The composition is best suited for use as a sealing agent, adhesive, coating agent or potting agent.

BENEFITS OF THE INVENTION

The present invention is directed to RTV organopolysiloxane compositions comprising a siloxane polymer comprising $R_3SiO_{1/2}$ units and $SiO_{4/2}$ units and a polysiloxane endcapped with a hydrolyzable silyl group via an alkylene linkage wherein a cure catalyst assists in inducing condensation crosslinking between hydroxysilyl groups on the siloxane polymer and hydrolyzable groups on the polysiloxane. The compositions have a low viscosity and good workability when heated, develop initial adhesion when allowed to cool after application, and thereafter cure at room temperature and induce crosslinking reaction, affording improved rubber physical properties.

DESCRIPTION OF THE PREFERRED EMBODIMENT

Component A

Component (A) in the RTV organopolysiloxane composition of the invention is an organosiloxane polymer comprising $R_3SiO_{1/2}$ units and $SiO_{4/2}$ units wherein R is each independently a substituted or unsubstituted monovalent hydrocarbon group of 1 to 6 carbon atoms. A molar ratio of $R_3SiO_{1/2}$ units to $SiO_{4/2}$ units ranges from 0.6:1 to 1.2:1. The polymer contains less than 0.04 mole of hydroxysilyl groups per 100 grams of the polymer. It is a resinous organosiloxane copolymer.

Specifically, R is independently at each occurrence selected from monovalent hydrocarbon groups of 1 to 6 carbon atoms, for example, alkyl groups such as methyl, ethyl, propyl, isopropyl, and hexyl; cycloalkyl groups such as cyclohexyl; alkenyl groups such as vinyl, allyl and propenyl; aryl groups such as phenyl; and substituted monovalent hydrocarbon groups, for example, substituted forms of the foregoing groups in which some or all hydrogen atoms are substituted by halogen atoms or the like, such as chloromethyl and 3,3,3-trifluoropropyl. These copolymers can be prepared through co-hydrolytic condensation of a hydrolyzable triorganosilane and an R-free hydrolyzable silane or siloxane and are well known in the art.

The organosiloxane polymer may further contain $RSiO_{3/2}$ and $R_2SiO_{2/2}$ units in a total amount of less than or equal to 10 mol %, preferably less than or equal to 5 mol % based on the total amount of $R_3SiO_{1/2}$ and $SiO_{4/2}$ units insofar as this does not compromise the benefits of the organosiloxane polymer.

The preferred content of hydroxysilyl groups is 0 to 0.03 mole per 100 grams of the polymer, with a hydroxysilyl content of 0 to 0.02 mole/100 g being more preferred.

Component B

Component (B) is a polysiloxane having a hydrolyzable silyl group incorporated in the molecular chain via an alkylene linkage. It serves as a crosslinking agent in the organopolysiloxane composition. Preferred as component (B) is one or more polysiloxanes having the general formulae (1) to (3).

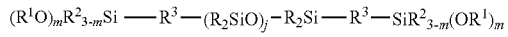

(1)

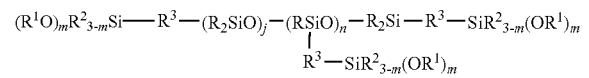

(2)

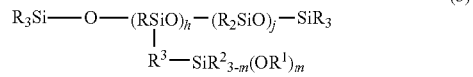

(3)

Herein R is as defined above. $R^1$ may be the same or different and stands for an alkyl group of 1 to 6 carbon atoms or an alkoxyalkyl group of 2 to 10 carbon atoms, preferably 2 to 6 carbon atoms. Exemplary alkyl groups include methyl, ethyl, propyl, isopropyl, and hexyl; and exemplary alkoxyalkyl groups include methoxymethyl, methoxyethyl, ethoxymethyl and ethoxyethyl. $R^2$ may be the same or different and is selected from substituted or unsubstituted monovalent hydrocarbon groups, which include alkyl groups of 1 to 20 carbon atoms, preferably 1 to 12 carbon atoms, aryl groups of 6 to 20 carbon atoms, preferably 6 to 15 carbon atoms, and substituted forms of the foregoing in which some hydrogen atoms are substituted by halogen atoms. Examples of $R^2$ include methyl, ethyl, propyl, isopropyl, butyl, hexyl, octyl, nonyl, myristyl, stearyl, phenyl, tolyl, xylyl, naphthyl, chloromethyl, and 3,3,3-trifluoropropyl. $R^3$ is an alkylene group of 1 to 12 carbon atoms, preferably 2 to 4 carbon atoms, such as methylene, ethylene, trimethylene or tetramethylene. The subscript m is an integer of 1 to 3; n is an integer of at least 1, preferably in the range of 1 to 50, more preferably 1 to 20; j is an integer of at least 10, preferably in the range of 20 to 10,000, more preferably 50 to 2,000; and h is an integer of at least 2, preferably in the range of 2 to 50, more preferably 2 to 20.

The polysiloxane (B) should preferably have a viscosity in the range of 100 to 1,000,000 mPa-s, and more preferably in the range of 500 to 200,000 mPa-s, as measured at 25° C. by a rotational viscometer.

The polysiloxane as the crosslinking agent (B) may be readily obtained through addition reaction of a silane having hydrosilyl and alkoxy groups to a corresponding alkenylsiloxane or of a silane having alkenyl and alkoxy groups to a corresponding hydrosiloxane, in the presence of a catalyst. Since the invention requires that the RTV organopolysiloxane composition be heated prior to curing, the composition must be fully heat resistant in the uncured state. It is then requisite that the hydrolyzable silyl group be attached to the siloxane molecular chain via an alkylene linkage.

The polysiloxane is compounded in an amount of 50 to 200 parts by weight, preferably 70 to 150 parts by weight per 100 parts by weight of component (A). On this basis, less than 50 parts by weight of the polysiloxane fails to achieve satisfactory viscosity vs. temperature and rubber physical properties whereas more than 200 parts by weight provides the composition with a remarkably increased viscosity, detracting from workability when heated.

Component C

Component (C) in the inventive composition is a cure catalyst that catalyzes condensation reaction of component (B). Suitable cure catalysts include tin ester compounds such as tin dioctoate; alkyltin ester compounds such as dibutyltin diacetate, dibutyltin dilaurate, and dibutyltin dioctoate; titanates and titanium chelates such as tetraisopropoxytitanium, tetra-n-butoxytitanium, tetrakis(2-ethylhexoxy)titanium, dipropoxybis(acetylacetonato)titanium, and titanium isopropoxyoctylene glycol; organometallic compounds such as zinc naphthenate, zinc stearate, zinc 2-ethyloctoate, iron 2-ethylhexoate, cobalt 2-ethylhexoate, manganese 2-ethylhexoate, cobalt naphthenate, and alkoxyaluminum compounds; aminoalkyl-substituted alkoxysilanes such as 3-aminopropyltriethoxysilane and N-(β-aminoethyl)-γ-aminopropyltrimethoxysilane; amine compounds and salts thereof such as hexylamine, dodecylamine phosphate, tetramethylguanidine and diazabicyclononane; quaternary ammonium salts such as benzyltriethylammonium acetate; alkali metal salts of lower fatty acids such as potassium acetate, sodium acetate and lithium oxalate; dialkylhydroxylamines such as dimethylhydroxylamine and diethylhydroxylamine; and guanidyl-containing silanes or siloxanes such as tetramethylguanidylpropyltrimethoxysilane, tetramethylguanidylpropylmethyldimethoxysilane and tetramethylguanidylpropyltris(trimethylsiloxy)silane. Of these, preferred are the amine compounds such as tetramethylguanidine and diazabicyclononane, and the guanidyl-containing silanes or siloxanes such as tetramethylguanidylpropyltrimethoxysilane, tetramethylguanidylpropylmethyldimethoxysilane and tetramethylguanidylpropyltris(trimethylsiloxy)silane. The tin ester compounds and alkyltin ester compounds are also preferred. These catalysts may be used alone or in admixture of two or more.

The cure catalyst is used in an amount of 0.01 to 10 parts by weight, preferably 0.05 to 5 parts by weight per 100 parts by weight of component (A).

Component D

In the RTV organopolysiloxane composition of the invention, (D) a hydrolyzable silane or siloxane may be used as a shelf stabilizer and a crosslinking agent. Since the invention requires that the RTV organopolysiloxane composition be heated prior to curing, it is preferred to use a hydrolyzable silane or siloxane containing an alkoxy group of 1 to 10 carbon atoms, specifically 1 to 3 carbon atoms, as a hydrolyzable group and having a boiling point of at least 150° C./760 Torr, in order to prevent bubbling and foaming. Examples of suitable hydrolyzable silanes and siloxanes include phenyltrimethoxysilane (110° C./20 Torr), α-trimethoxysilyldecane (132° C./10 Torr), methyltriethoxysilane (161° C./760 Torr), vinyltriethoxysilane (63° C./20 Torr), phenyltriethoxysilane (116° C./14 Torr), tetraethoxysilane (80° C./40 Torr), methyltriisopropoxysilane (82° C./13 Torr), partial hydrolyzates of tetramethoxysilane, partial hydrolyzates of tetraethoxysilane, and phenyltriisopropenoxysilane (118° C./5 Torr).

Typically component (D) is used in an amount of 0.1 to 10 parts by weight, preferably 0.5 to 5 parts by weight per 100 parts by weight of component (A).

Component E

In the RTV organopolysiloxane composition of the invention, (E) a filler may be compounded as a reinforcing or extending agent. Suitable fillers include surface treated and/or untreated fumed silica, wet silica, precipitated silica, metal oxides, metal hydroxides, metal carbonates, glass beads, glass balloons, resin beads, resin balloons, and the like. Fumed silica, precipitated silica and calcium carbonate are preferred.

Typically the filler (E) is used in an amount of 1 to 500 parts by weight, preferably 5 to 250 parts by weight per 100 parts by weight of component (A). On this basis, less than 1 pbw of the filler may fail to achieve the reinforcing and extending effects whereas more than 500 pbw may cause difficulty in discharging the composition, detracting from workability.

Component F

In the RTV organopolysiloxane composition of the invention, (F) a silane coupling agent may be compounded as an adhesion promoter. Any silane coupling agents known in the art may be used. Preferred are those silane coupling agents having an alkoxysilyl or alkenoxysilyl group as the hydrolyzable group, including vinyltris (β-methoxyethoxy)silane,
γ-methacryloxypropyltrimethoxysilane,
β-(3,4-epoxycyclohexyl)ethyltrimethoxysilane,
γ-glycidoxypropyltrimethoxysilane,
γ-glycidoxypropylmethyldiethoxysilane,
N-(β-aminoethyl)-γ-aminopropyltrimethoxysilane,
γ-aminopropyltriethoxysilane,
γ-mercaptopropyltrimethoxysilane,
γ-glycidoxypropyltriisopropenoxysilane, and
γ-glycidoxypropylmethyldiisopropenoxysilane. Inter alia, amine-based silane coupling agents are desirable.

Typically the silane coupling agent (F) is used in an amount of 0.1 to 20 parts by weight, preferably 0.2 to 10 parts by weight per 100 parts by weight of component (A). On this basis, less than 0.1 pbw of component (F) may fail to promote adhesion whereas more than 10 pbw is economically disadvantageous.

Additives

Optionally, a variety of additives may be added to the RTV organopolysiloxane composition of the invention insofar as they do not adversely affect the benefits of the invention. Suitable additives include thixotropic agents such as polyethers, plasticizers such as silicone oil and isoparaffins, colorants such as pigments, dyes and fluorescent brighteners, biologically active agents such as mildew-proof agents, antifungal agents, insect repellents and marine organism repellents, bleed oils such as phenylsilicone oil and fluorosilicone oil, surface modifiers such as silicone-incompatible organic liquids, and solvents such as toluene, xylene, gasoline, cyclohexane, methylcyclohexane, and low-boiling isoparaffins.

On use, the RTV organopolysiloxane composition of the invention is heated to a temperature of 50 to 250° C., especially 100 to 200° C. so as to reduce the viscosity thereof, coated or otherwise applied to substrates (e.g., metals, organic resins or the like), then allowed to cool to room temperature. During the cooling process, the composition develops adhesion. When held under the ambient condition for some time, the composition cures through condensation.

The inventive compositions are effectively workable and adherent during the process and once cured, show satisfactory rubber physical properties. They are best suited for use as sealing agents, adhesives, coating agents, potting agents or the like.

EXAMPLE

Examples of the invention are given below by way of illustration and not by way of limitation. Note that all parts are by weight, and the viscosity is a measurement at 25° C. by a rotational viscometer. Me is methyl.

Example 1

Composition #1 was prepared by combining 100 parts of an organosiloxane polymer consisting of $Me_3SiO_{1/2}$ units and $SiO_{4/2}$ units, having a molar ratio of $Me_3SiO_{1/2}$ units to $SiO_{4/2}$ units of 0.75 and a hydroxysilyl content of 0.025 mole/100 g, 100 parts of a dimethylpolysiloxane capped at both ends with a trimethoxysilyl group via a silethylene group and having a viscosity of 30,000 mPa–s, and 3 parts of dipropoxybis(acetylacetonato)titanium, and mixing them until uniform.

Example 2

Composition #2 was prepared as in Example 1 except that 3 parts of tetrabutoxytitanium was used instead of 3 parts of dipropoxybis(acetylacetonato)titanium.

Comparative Example 1

Composition #3 was prepared as in Example 1 except that an organosiloxane polymer consisting of $Me_3SiO_{1/2}$ units and SiO$_{4/2}$ units, having a molar ratio of Me$_3$SiO$_{1/2}$ units to SiO$_{4/2}$ units of 0.75 and a hydroxysilyl content of 0.06 mole/100 g was used instead of the organosiloxane polymer consisting of Me$_3$SiO$_{1/2}$ units and SiO$_{4/2}$ units, having a molar ratio of Me$_3$SiO$_{1/2}$ units to SiO$_{4/2}$ units of 0.75 and a hydroxysilyl content of 0.025 mole/100 g. The composition gelled in the mixer, inhibiting further kneading.

Comparative Example 2

Composition #4 was prepared as in Example 1 except that the organosiloxane polymer consisting of Me$_3$SiO$_{1/2}$ units and SiO$_{4/2}$ units, having a molar ratio of Me$_3$SiO$_{1/2}$ units to SiO$_{4/2}$ units of 0.75 and a hydroxysilyl content of 0.025 mole/100 g was omitted.

The compositions of Examples 1-2 and Comparative Examples 1-2 were coated onto aluminum and glass substrates in a 150° C. atmosphere and cooled to 23° C., after which adhesion was examined. Separately, the compositions were formed into sheets of 2 mm thick in a 150° C. atmosphere and allowed to cure in an atmosphere of 23±2° C. and 50±5% RH for 7 days, after which rubber physical properties were determined. The results are shown in Table 1.

TABLE 1

|  |  | Example | | Comparative Example | |
|---|---|---|---|---|---|
|  |  | 1 | 2 | 1 | 2 |
|  |  | Composition | | | |
|  |  | #1 | #2 | #3 | #4 |
| Adhesion | Aluminum | bonded | bonded | could not be prepared | peeled |
|  | Glass | bonded | bonded |  | peeled |
| Rubber physical properties | Hardness, Durometer A | 15 | 13 |  | 10 |
|  | Elongation, % | 900 | 810 |  | 300 |
|  | Tensile strength, MPa | 4.0 | 3.5 |  | 0.5 |

Example 3

Composition #5 was prepared by combining 100 parts of an organosiloxane polymer consisting of Me$_3$SiO$_{1/2}$ units and SiO$_{4/2}$ units, having a molar ratio of Me$_3$SiO$_{1/2}$ units to SiO$_{4/2}$ units of 0.75 and a hydroxysilyl content of 0.025 mole/100 g, 100 parts of a dimethylpolysiloxane capped at both ends with a trimethoxysilyl group via a silethylene group and having a viscosity of 30,000 mPa-s, 3 parts of dipropoxybis(acetylacetonato)titanium, and 3 parts of α-trimethoxysilyldecane and mixing them until uniform.

Example 4

Composition #6 was prepared as in Example 3 except that 3 parts of a partial hydrolyzate of tetramethoxysilane was used instead of 3 parts of α-trimethoxysilyldecane.

Example 5

Composition #7 was prepared as in Example 3 except that 3 parts of methyltrimethoxysilane was used instead of 3 parts of α-trimethoxysilyldecane.

The compositions of Examples 3-5 were coated onto aluminum and glass substrates in a 150° C. atmosphere and cooled to 23° C., after which adhesion was examined. Separately, the compositions were formed into sheets of 2 mm thick in a 150° C. atmosphere and allowed to cure in an atmosphere of 23±2° C. and 50±5% RH for 7 days, after which rubber physical properties were determined. The results are shown in Table 2.

TABLE 2

|  |  | Example | | |
|---|---|---|---|---|
|  |  | 3 | 4 | 5 |
|  |  | Composition | | |
|  |  | #5 | #6 | #7 |
| Adhesion | Aluminum | bonded | bonded | bonded |
|  | Glass | bonded | bonded | bonded |
| Rubber physical properties | Hardness, Durometer A | 17 | 18 | 10 |
|  | Elongation, % | 1,100 | 1,000 | 500 |
|  | Tensile strength, MPa | 3.6 | 4.0 | 1.2 |

It is noted that fine bubbles were observed in the cured rubber of Composition #7.

Japanese Patent Application No. 2005-141295 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A room temperature-curable organopolysiloxane composition comprising
   (A) 100 parts by weight of an organosiloxane polymer comprising R$_3$SiO$_{1/2}$ units and SiO$_{4/2}$ units wherein R is each independently a substituted or unsubstituted monovalent hydrocarbon group of 1 to 6 carbon atoms, a molar ratio of R$_3$SiO$_{1/2}$ units to SiO$_{4/2}$ units being from 0.6 to 1.2, and the polymer contains less than 0.04 mole of hydroxysilyl groups per 100 grams of the polymer,
   (B) 50 to 150 parts by weight of at least one member selected from polysiloxanes having the general formulae (1) to (3):

(1)

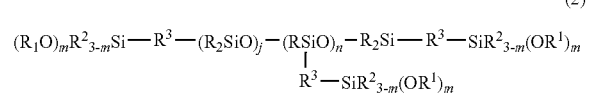
(2)

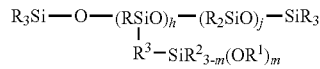
(3)

wherein R is as defined above, R$^1$ is each independently an alkyl group of 1 to 6 carbon atoms or alkoxyalkyl group of 2 to 10 carbon atoms, R$^2$ is each independently a substituted or unsubstituted monovalent hydrocarbon group, R$^3$ is an alkylene group of 1 to 12 carbon atoms, m is an integer of 1 to 3, n is an integer of at least 1, j is an integer of at least 10, and h is an integer of at least 2,
   (C) 0.01 to 10 parts by weight of a cure catalyst, and
   (D) 0.1 to 10 parts by weight of α-trimethoxysilyldecane.

2. The composition of claim 1, further comprising (E) 1 to 500 parts by weight of a filler.

3. The composition of claim 2 wherein the filler is selected from fumed silica, precipitated silica and calcium carbonate.

4. The composition of claim 1, further comprising (F) 0.1 to 20 parts by weight of a silane coupling agent.

5. The composition of claim 4, wherein the silane coupling agent is selected from the group consisting of vinyltris(β-methoxyethoxy)silane, γ-methacryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, N-(β-aminoethyl)-γ-aminopropyltrimethoxysilane, γ-aminopropyltriethoxysilane, γ-mercaptopropyltrimethoxysilane, γ-glycidoxypropyltriisopropenoxysilane, and γ-glycidoxypropylmethyldiisopropenoxysilane.

6. The composition of claim 1 which is used as a sealing agent, adhesive, coating agent or potting agent.

7. A room temperature-curable organopolysiloxane composition comprising
(A) 100 parts by weight of an organosiloxane polymer comprising $R_3SiO_{1/2}$ units and $SiO_{4/2}$ units wherein R is each independently a substituted or unsubstituted monovalent hydrocarbon group of 1 to 6 carbon atoms, a molar ratio of $R_3SiO_{1/2}$ units to $SiO_{4/2}$ units being from 0.6 to 1.2, and the polymer contains less than 0.04 mole of hydroxysilyl groups per 100 grams of the polymer,
(B) 50 to 150 parts by weight of at least one member selected from polysiloxanes having the general formulae (1) to (3):

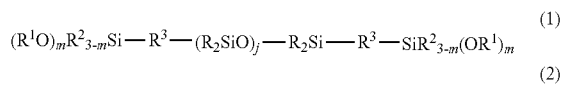

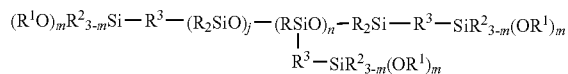

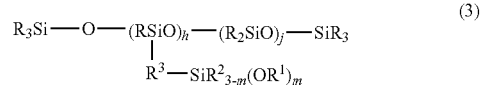

wherein R is as defined above, $R^1$ is each independently an alkyl group of 1 to 6 carbon atoms or alkoxyalkyl group of 2 to 10 carbon atoms, $R^2$ is each independently a substituted or unsubstituted monovalent hydrocarbon group, $R^3$ is an alkylene group of 1 to 12 carbon atoms, m is an integer of 1 to 3, n is an integer of at least 1, j is an integer of at least 10, and h is an integer of at least 2, (C) 0.01 to 10 parts by weight of a cure catalyst,
(D) 0.1 to 10 parts by weight of a member selected from the group consisting of phenyltrimethoxysilane, α-trimethoxysilyldecane, methyltriethoxysilane, vinyltriethoxysilane, phenyltriethoxysilane, tetraethoxysilane, methyltriisopropoxysilane, partial hydrolyzates of tetramethoxysilane, partial hydrolyzates of tetraethoxysilane, and phenyltriisopropenoxysilane; and
(F) 0.1 to 20 parts by weight of a silane coupling agent selected from the group consisting of vinyltris(β-methoxyethoxy)silane, γ-methacryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, N-(β-aminoethyl)-γ-aminopropyltrimethoxysilane, γ-aminopropyltriethoxysilane, γ-mercaptopropyltrimethoxysilane, γ-glycidoxypropyltriisopropenoxysilane, and γ-glycidoxypropylmethyldiisopropenoxysilane.

8. The composition of claim 7, further comprising (E) 1 to 500 parts by weight of a filler.

9. The composition of claim 8 wherein the filler is selected from fumed silica, precipitated silica and calcium carbonate.

10. The composition of claim 7, which is used as a sealing agent, adhesive, coating agent or potting agent.

* * * * *